United States Patent

Marble et al.

(10) Patent No.: US 9,139,064 B2
(45) Date of Patent: Sep. 22, 2015

(54) DAMPER ASSEMBLY FOR VEHICLE SUSPENSION SYSTEM WITH FLUID DAMPER AND MULTI-CHAMBER GAS SPRING AND METHOD OF CONTROLLING PRE-LOAD, SPRING RATE AND RIDE HEIGHT

(71) Applicant: GM GLOBAL TECHNOLOGY OPERATIONS LLC, Detroit, MI (US)

(72) Inventors: Robert P. Marble, White Lake, MI (US); Robert G. Izak, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 133 days.

(21) Appl. No.: 13/973,299

(22) Filed: Aug. 22, 2013

(65) Prior Publication Data

US 2015/0054234 A1 Feb. 26, 2015

(51) Int. Cl.
  *B60G 17/00* (2006.01)
  *B60G 17/04* (2006.01)
  *B60G 15/12* (2006.01)
  *B60G 17/08* (2006.01)

(52) U.S. Cl.
  CPC ............ *B60G 17/0416* (2013.01); *B60G 15/12* (2013.01); *B60G 17/08* (2013.01); *B60G 2400/10* (2013.01); *B60G 2400/20* (2013.01); *B60G 2400/50* (2013.01); *B60G 2400/5122* (2013.01); *B60G 2400/5182* (2013.01); *B60G 2500/10* (2013.01); *B60G 2500/206* (2013.01); *B60G 2500/30* (2013.01)

(58) Field of Classification Search
  CPC ..... B60G 17/0416; B60G 17/08; F16F 9/063; F16F 9/065
  See application file for complete search history.

(56) References Cited

U.S. PATENT DOCUMENTS

| | | | | |
|---|---|---|---|---|
| 3,391,921 A | * | 7/1968 | Axthammer | 267/64.17 |
| 4,746,106 A | * | 5/1988 | Fukumura | 267/218 |
| 4,798,398 A | * | 1/1989 | Cummins | 280/124.159 |
| 8,573,606 B1 | * | 11/2013 | Kim et al. | 280/6.157 |
| 2014/0265203 A1 | * | 9/2014 | Zuleger et al. | 280/124.16 |
| 2014/0353938 A1 | * | 12/2014 | Marble | 280/124.157 |

* cited by examiner

*Primary Examiner* — Paul N Dickson
*Assistant Examiner* — Robert A Coker
(74) *Attorney, Agent, or Firm* — Quinn Law Group, PLLC

(57) ABSTRACT

A vehicle suspension system enables active control of preload, spring rate, and ride height by using a fluid damper housing defining an interior chamber containing an incompressible fluid and a hollow rod supporting a piston extending into the interior chamber. The housing is movable relative to the hollow rod such that fluid volume in the interior chamber varies. A multi-chambered manifold is operatively connected to the hollow rod and has a first gas chamber in fluid communication with a second gas chamber. A first plunger, a second plunger, and a third plunger are supported by the manifold. A first actuator is operable to move the third plunger to vary a volume of the first gas chamber between the first and third plungers. A second actuator is operable to move the second plunger to vary a volume of the second gas chamber in communication with the first gas chamber.

11 Claims, 4 Drawing Sheets

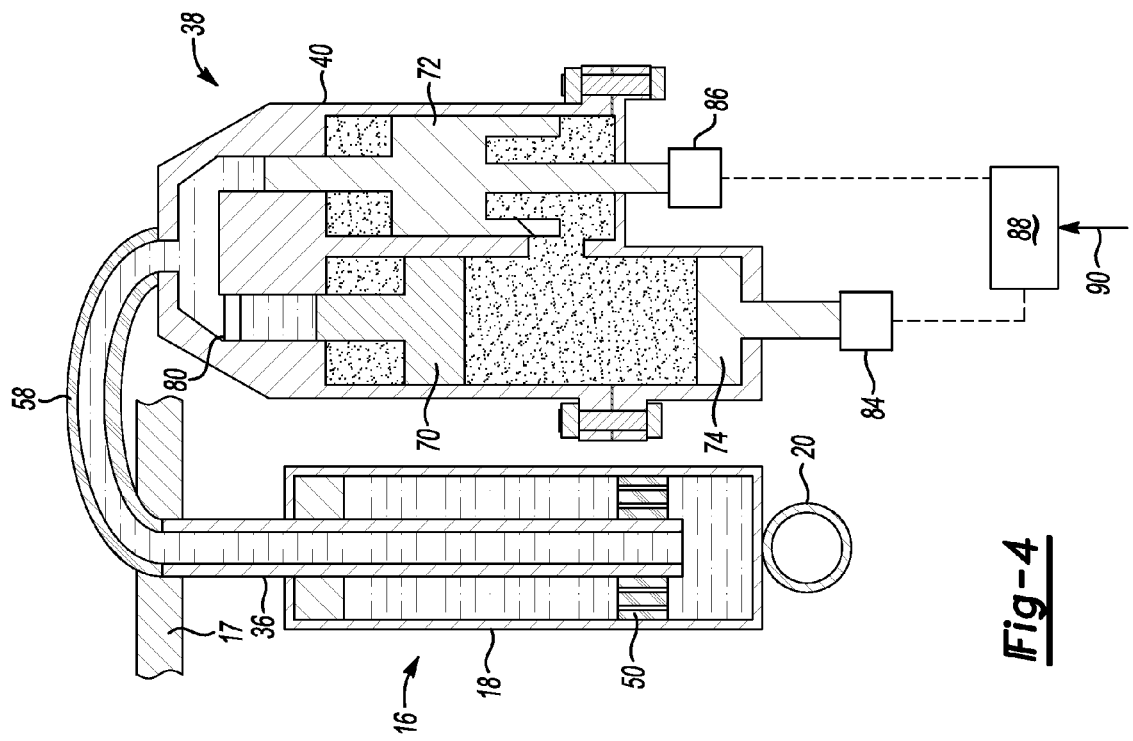
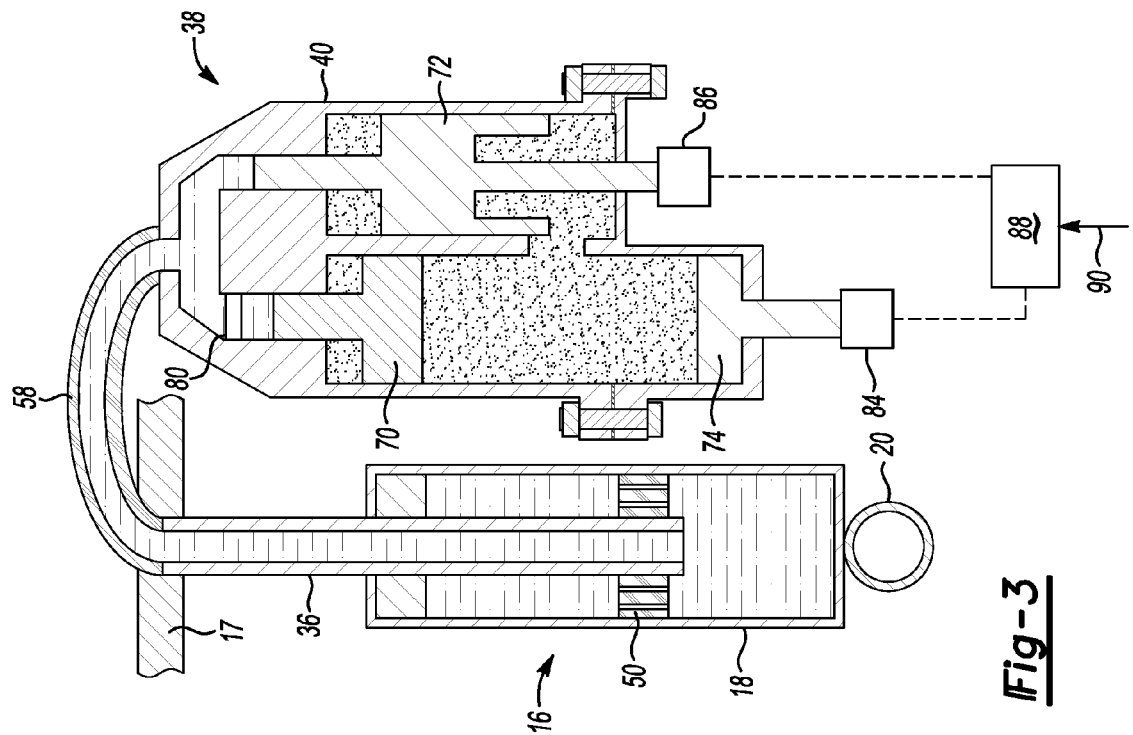

DAMPER ASSEMBLY FOR VEHICLE SUSPENSION SYSTEM WITH FLUID DAMPER AND MULTI-CHAMBER GAS SPRING AND METHOD OF CONTROLLING PRE-LOAD, SPRING RATE AND RIDE HEIGHT

TECHNICAL FIELD

The present teachings generally include a vehicle suspension system and a method of control of the suspension system.

BACKGROUND

Damper assemblies are used in vehicle suspension systems to dissipate the energy of road forces applied to vehicle wheels in order to control the transmission of forces to the unsprung mass of the vehicle. Some suspension systems are passive, so that pre-load, spring rate, and ride height of the vehicle are nonadjustable, single predetermined values determined by the design of the damper assembly. In some systems, pre-load, spring rate, and ride height are variable, but not all in a controlled manner. Other suspension systems are actively controlled, so that ride height of the vehicle can be varied. Still other suspension systems allow adjustment of the spring rate or of the pre-load.

SUMMARY

A vehicle suspension system is provided that enables active control of pre-load, spring rate, and ride height by using a fluid damper in communication with a multi-chambered gas spring. Specifically, a vehicle suspension system is provided that includes a housing defining an interior chamber containing an incompressible fluid and a hollow rod supporting a piston extending into the interior chamber. The housing is movable relative to the hollow rod such that fluid volume in the interior chamber varies. A multi-chambered manifold is operatively connected to the hollow rod and has a first gas chamber and a second gas chamber in selective fluid communication with one another. As used herein, the gas chambers are in "fluid communication" with one another when they are not physically closed off from one another and gas is therefore able to pass between the two chambers. A first plunger, a second plunger, and a third plunger are supported by the manifold. The first plunger extends into the first gas chamber and is in fluid communication with the interior chamber via the hollow rod so that the first plunger moves relative to the first gas chamber in response to movement of the housing relative to the hollow rod. The second plunger extends into the second gas chamber and is in fluid communication with the interior chamber via the hollow rod. The third plunger extends into the first gas chamber. A first actuator is operable to move the third plunger to vary a volume of the first gas chamber between the first and third plungers. A second actuator is operable to move the second plunger to vary a volume of the second gas chamber in fluid communication with the first gas chamber and simultaneously vary fluid volume in the interior chamber to thereby move the housing relative to the hollow rod.

Accordingly, the damper assembly can be controlled to provide supplementary pre-load on the first gas chamber, enabling low frequency roll, pitch, and heave compensation. Moreover, the damper assembly can be controlled to alter the spring rate and the ride height. A method of controlling a vehicle suspension system having such a damper assembly connected between a tire and wheel assembly and a sprung mass of the vehicle includes receiving a first input signal indicative of desired pre-load of the damper assembly, and receiving a second input signal indicative of one of a desired spring rate of the damper assembly and a desired ride height of the vehicle. The method includes controlling the first actuator in response to the first input signal to move the third plunger, thereby establishing the desired pre-load of the damper assembly, and controlling the second actuator in response to the second input signal to establish the desired spring rate of the damper assembly and/or the desired ride height of the vehicle.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3 is schematic illustration in fragmentary cross-sectional view of the portion of the vehicle suspension system having the damper assembly of FIG. 1 with the damper assembly in an intermediate position.

FIG. 4 is schematic illustration in fragmentary cross-sectional view of the portion of a vehicle suspension system having the damper assembly of FIG. 1 with the damper assembly in a compression position.

DETAILED DESCRIPTION

Figure 2:
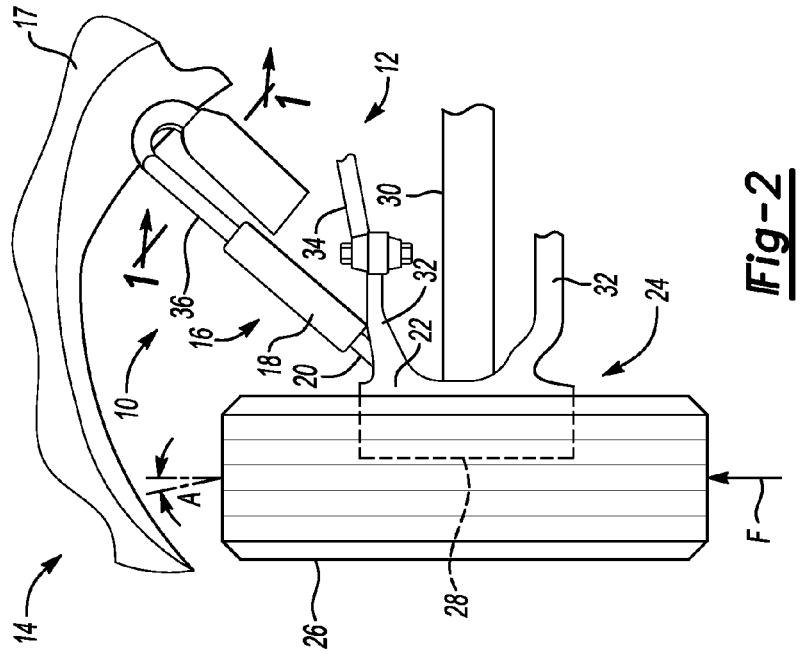
FIG. 2 is a schematic rear view illustration of a portion of a vehicle with the suspension system and damper assembly of FIG. 1.
Figure 1:
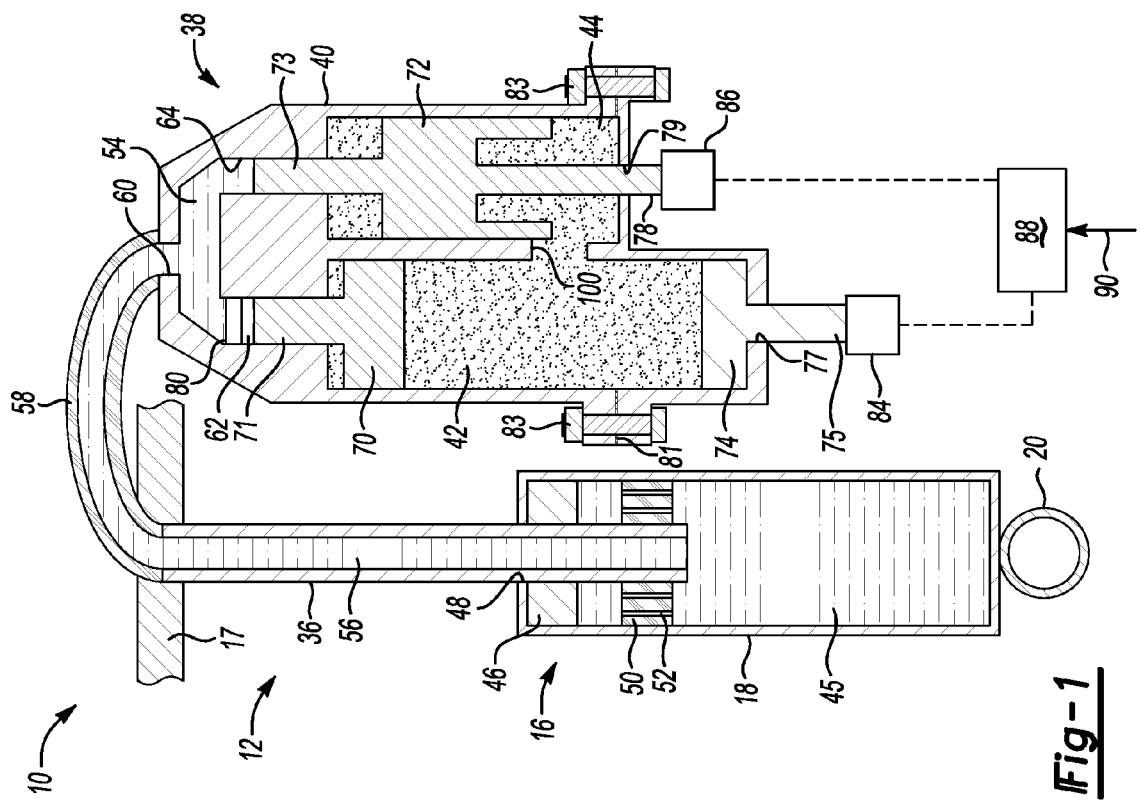
FIG. 1 is a schematic illustration in fragmentary cross-sectional view of a portion of a vehicle suspension system having a damper assembly taken at lines 1-1 in FIG. 2 with the damper assembly in an extension position.

Referring to the drawings, wherein like reference numbers refer to like components throughout the several views, FIG. 1 shows a suspension system 10 that includes a damper assembly 12 that enables active control of pre-load, spring rate, and ride height as described herein. As shown in FIG. 2, the suspension system 10 is included on a vehicle 14. Specifically, the damper assembly 12 includes a fluid damper 16 with a damper housing 18 that has an attachment 20 secured to a nonrotating hub portion 22 of a tire and wheel assembly 24. The tire and wheel assembly 24 has a tire 26 fit to a wheel 28 that rotates via a drive axle 30. Optionally, control arms 32 and a steering link 34 extend from the hub portion 22. Other suspension arrangements may instead be used, such as a solid axle suspension, a short long arm (SLA) suspension, a multi-link suspension, struts, or any suitable suspension system.

The fluid damper 16 has a hollow rod 36, one end of which is fixed to a sprung mass of the vehicle 14, such as to a vehicle body 17. Alternatively, the rod 36 could be fixed to another portion of the vehicle 14, such as to a vehicle frame member. A dust cover or an external tube can extend around the rod 36, but is removed for purposes of illustration in the drawings. When the vehicle 14 travels over a road, forces due to an uneven road surface, such as force F shown in FIG. 2, can be dampened by the damper assembly 12 to substantially dissipate the energy without excess transmission of road forces to the vehicle body 17, ensuring a smooth ride for vehicle occupants. The damper housing 18 and the manifold 40 are arranged adjacent to one another. This arrangement of the components allows the damper assembly 12 to be conveniently packaged between the tire and wheel assembly 24 and the vehicle body 17. Due to the flexible tube 58 described herein, the damper assembly 12 and manifold 40 can be oriented in a variety of different ways. For example, although the damper housing 18 and the manifold 40 are shown generally parallel with one another, the manifold 40 could instead be arranged along the wheel well of the vehicle body 17.

FIG. 1 shows that the damper assembly 12 has a gas spring 38 with a multi-chambered manifold 40 that defines a first gas chamber 42 and a second gas chamber 44. The chambers 42, 44 can be filled with any suitable gas, such as air or nitrogen. The chambers 42, 44 are filled with air in the embodiment shown, and can be referred to as pneumatic chambers. The housing 18 of the fluid damper 16 forms an interior chamber 45 that is filled with a liquid fluid, such as hydraulic fluid. The fluid damper 16 and gas spring 38 are operatively connected to work in series with one another as a hydro-pneumatic damper for the suspension system 10, providing damping as well as pre-load, spring rate, and ride height adjustment as described herein. Adaptive damping can be utilized, such as by configuring the fluid damper 16 as a magnetorheological damper or other adaptive configuration. Moreover, the damper 16 could be configured as a twin tube or triple tube damper rather than as a monotube damper.

The hollow rod 36 of the fluid damper 16 extends into the damper housing 18. A rod guide 46, also referred to as a bearing, is fixed inside the housing 18 at an end of the interior chamber 45 and surrounds the rod 36. A rod seal (not shown) can surround the rod 36 at the opening 48 of the housing 18 to ensure that fluid in the fluid-filled interior chamber 45 cannot leak past rod 36 out of the opening 48. A piston 50 is secured around the hollow rod 36. When the tire and wheel assembly 24 of FIG. 2 moves relative to the vehicle body 17, the housing 18 moves relative to the body 17 and relative to the hollow rod 36 fixed to the body 17. This causes the piston 50 to slide against the inner walls of the housing 18. The piston 50 can be formed with passages 52 that allow the fluid in the interior chamber 45 to pass from one side of the piston 50 to the other side of the piston 50 as the housing 18 moves.

Figure 5:
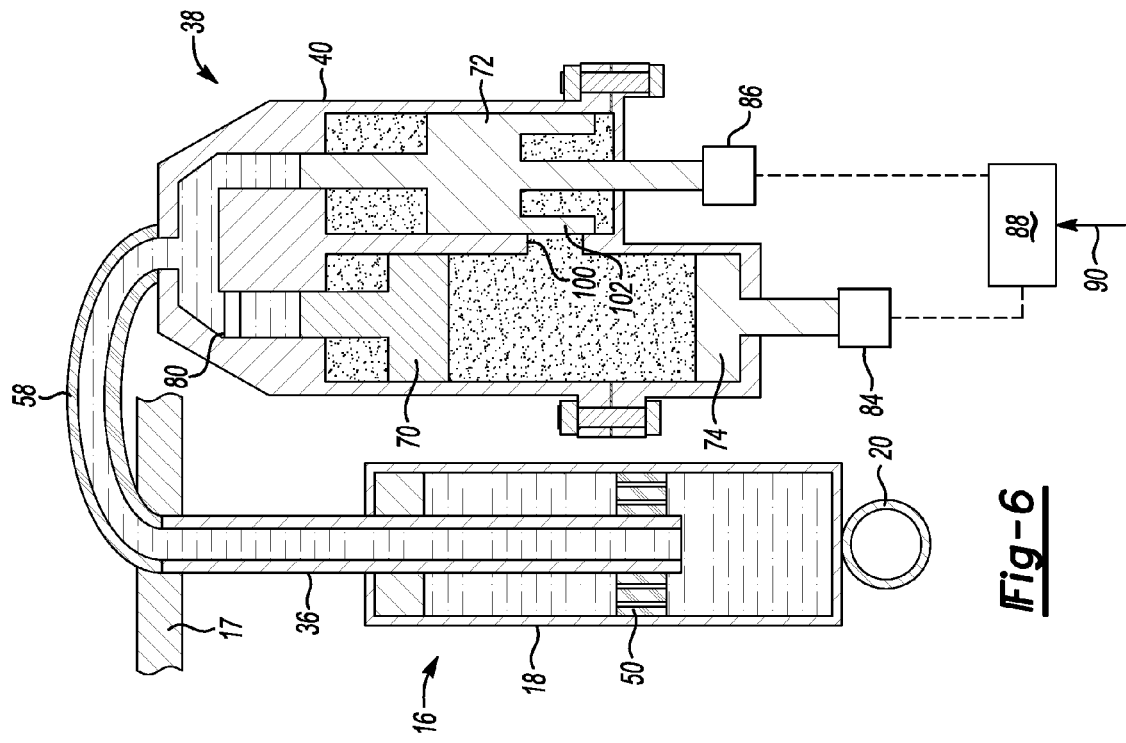
FIG. 5 is a schematic illustration in fragmentary cross-sectional view of the portion of a vehicle suspension system having the damper assembly of FIG. 1 with the damper assembly in the intermediate position and a first actuator actuating a plunger to vary pre-load.

The manifold 40 of the gas spring 38 is formed with a fluid passageway 54 that is in fluid communication with the hydraulic fluid in a rod passageway 56 of the hollow rod 36. Namely, a hollow flexible tube 58 connects the hollow rod 36 to the manifold 40 at an opening 60 in the manifold 40 leading to the passageway 54. In different embodiments, the tube 58 may or may not be flexible. The passageway 54 branches into two branch passages 62, 64. The manifold 40 supports a first plunger 70 in the first branch passage 62 and a second plunger 72 in the second branch passage 64. The first plunger 70 extends into the first gas chamber 42 and can slide relative to the manifold 40, but is physically constrained by a positive stop, such as a seal or lip that retains the neck 71 of the plunger 70 in the passageway 62 even at its most extended position of FIG. 4. Similarly, the second plunger 72 extends into the second gas chamber 44 and can slide relative to the manifold 40, but is physically constrained by a positive stop, such as a seal or lip that retains the neck 73 of the plunger 72 in the passageway 64 even at its most extended position of FIG. 6. A third plunger 74 is supported by the manifold 40 in the first gas chamber 42. The third plunger 74 can slide relative to the manifold 40, but is physically constrained by a positive stop, such as a seal or lip that retains the neck 75 of the third plunger 74 at an opening 77 of the manifold 40 even at its most extended position of FIG. 5. The second plunger 72 includes another neck 78 that extends out of an opening 79 of the manifold 40 and can slide relative to the manifold 40, but is physically constrained by a positive stop, such as a seal or lip that retains the neck 78 of the second plunger 72 at the opening 79 even at its most extended position of FIG. 1.

Alternatively, two separate plungers could be used in place of the plunger 72, one having neck 73 and the other placed in an adjacent chamber and having neck 78 so that the plunger with neck 73 acting on the fluid is decoupled from the plunger with neck 78 acting on the gas. In another alternative embodiment, the plunger 72 and the manifold 40 could be configured in a bi-state arrangement so that instead of a varying volume of the second chamber 44 being available, the only available operating states are a first state in which only the volume of the first chamber 42 is available, and a second state in which the volumes of both the first chamber 42 and the entire second chamber 44 are available.

When the damper housing 18 moves relative to the hollow rod 36 due to the tire and wheel assembly 24 moving closer or further from the vehicle body 16, hydraulic fluid can be forced through the hollow rod 36 and tube 58 and acts on the first and second plungers 70, 72. That is, the first and second plungers 70, 72 are exposed to and in fluid communication with the fluid-filled chamber 45 via the hollow rod 36. Referring again to FIG. 1, the road forces and associated movement of the damper housing 18 cause the piston 50 to slide against the moving damper housing 18 within the fluid-filled chamber 45 in a compressive mode, shown in FIGS. 3 and 4, or in an extension mode, shown in FIG. 1. The movement of the damper housing 18 relative to the sliding piston 50 disrupts the static pressure in the fluid-filled chamber 45. The fluid in the fluid-filled chamber 45 is incompressible. Thus, when the damper housing 18 moves upward from the position of FIG. 1 to the position of FIG. 3 or 4, such that the piston 50 moves downward in the damper housing 18, a greater length of the rod 36 extends into the fluid-filled chamber 45 causing a reduction in available fluid volume in the fluid-filled chamber 45. Fluid displaced due to the rod 36 travels through the rod 36 and through the flexible tube 58 to act on the necks 71, 73 of the first and second plungers 70, 72. This causes the first plunger 70 to move further into the first chamber 42, as indicated by the movement from FIG. 1 to FIG. 3, compressing the gas in the first chamber 42. The reaction force of the fluid in the chamber 45 on the piston 50, and the reaction force of the gas in the first chamber 42 on the plunger 70 dampens the movement of the damper housing 18 and the tire and wheel assembly 14 an amount and at a rate dependent on the relative positions of the second and third plungers 72, 74 as discussed herein. When road forces cause the damper housing 18 to instead move further from the vehicle body 17, such as shown in moving from the position of FIG. 3 to the position of FIG. 1 (i.e., an extension mode), the damper 16 damps movement of the damper housing 18 as it slides downward relative to the piston 50 as shown in FIG. 3, and a lesser portion of the rod 36 is within the chamber 45, increasing available volume in the chamber 45 and reducing pressure on the first and second plungers 70, 72. Vents to atmosphere can be provided in the manifold 40 to the spaces at the upper sides of the plungers 70, 72 in FIG. 1 to prevent a vacuum formation in the chambers 42, 44 when the plungers 70, 72 move upward.

In order to enable significant damping, the gas charge pressure in the gas-filled chambers 42, 44 must be high enough to react against the fluid forces in the fluid-filled chamber 45 both during static conditions and dynamic compression. That is, the damping available is limited by the gas charge. Increasing the gas charge pressure, however, increases the pressure acting on seals within the damper assembly 12 (such as a seal (not shown) around the rod 36 at the opening 48), which increases relative friction between the seal and the moving rod 36 and requires more expensive seals. Optionally, a passive valve assembly 80 can be included in the passageway 62 of the multi-chambered manifold 40 (i.e., between the hollow rod 36 and the first plunger 70). The passive valve assembly 80 is shown in greater detail in FIG. 7 and enables a pressure drop to be created during dynamic flow of the hydraulic fluid such that dynamic fluid pressure in the hollow rod 36 and in the passageway 54 is greater than dynamic fluid pressure in the branch passage 62 acting on the first plunger 70. In other embodiments, a passive valve assembly or other device configured to function like passive valve assembly 80 to create a pressure drop could be positioned to create a dynamic pressure drop at the opening 60 (from rod passageway 56 to fluid passageway 54), or between fluid passageway 54 and branch passageway 64. Such devices could be in addition to or as an alternative to the passive valve assembly 80, depending upon the application of the damper assembly 12. The passive valve assembly 80 thus enables a lower static pressure, and a lower gas charge pressure in the first chamber 42, which can permit the use of less expensive seals between the manifold 40 and each of the plunger necks 71, 73, 75, 78. One such seal 81 is shown between portions of the manifold 40 that are secured to one another by fasteners 83, such as bolts or any other suitable fastening or connecting means. Although the manifold 40 is shown in two portions held together with fasteners 83, the manifold 40 could be a single unitary component or could have more than two portions.

Figure 7:
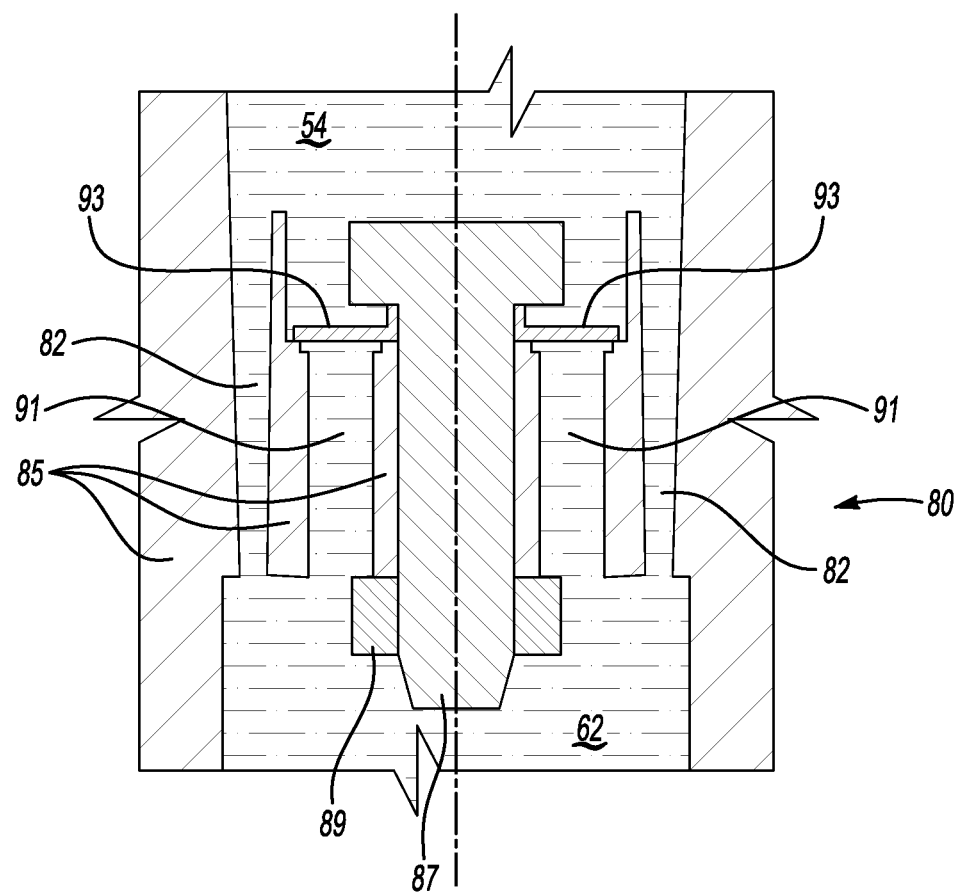
FIG. 7 is a schematic illustration in fragmentary cross-sectional view of a passive valve assembly included in the damper assembly of FIG. 1.

A pressure drop is created across the valve assembly 80 during dynamic compression of the damper 16 in order to achieve a high enough dynamic pressure while allowing a lower static pressure acting on the neck 16 of the first plunger 70 than in a conventional monotube damper, and thus a lower gas charge pressure in the gas-filled chamber 42. Referring to FIG. 7, the valve assembly 80 has a valve body 85 with a first flow passage 82 that provides restriction between the passageway 54 and the branch passage 62. This can be achieved with any scalable orifice as a metering method, and can be straight, tapered or otherwise shaped. In the embodiment shown, the first flow passage 82 tapers from the passageway 54 to the branch passage 62. The example valve assembly 80 is configured to be more restrictive of flow from the passageway 54 to the branch passage 62 than of flow from the branch passage 62 to the passageway 54. The first flow passage 82 may be annular, and has a greater flow area at a first end nearest passageway 54 than at a second end nearest branch passage 62. Multiple first flow passages 82 can be formed in the valve body 85. The passages 82 can be defined by aligned openings of multiple stacked discs held together by a central fastener 87 and nut 89. Alternatively, the valve body 85 can be an integral with the manifold 40.

The valve assembly 80 also has a second flow passage 91 that can be an annular passage or series of passages extending from the branch passage 62 to the passageway 54. The valve assembly 80 includes one or more one-way valves 93 that are configured to block flow from the passageway 54 through the second flow passage 91. That is, the one-way valves 93 are configured to prevent flow through the second flow passage 91 when the damper 16 is in compression mode. In this mode, flow is permitted only through passages 82. However, the one-way valves 93 permit flow from the branch passage 62 to the passageway 54 through the second flow passage 91 when the damper 16 is in expansion mode. In this mode, flow is permitted through both passages 82 and 91.

The one-way valves 93 can be one or more ball check valves, one or more valve plates, one or more flapper members, or any other suitable one-way valve or valves. In the embodiment shown, the one-way valves 93 are flapper members that are held against the valve body 85 by the fastener 87, such as a bolt or rivet, and are configured to be pushed against the valve body 85 when the damper 16 is in compression mode. The flapper members are configured to pivot open toward the passageway 54, moving away from the valve body 85, when the damper 16 is in expansion mode.

The damper assembly 12 allows active control of the suspension system 10 to change the spring rate, damping characteristics, as well as to adjust the ride height of the vehicle 14. Active control is accomplished via a first actuator 84 that can be controlled to selectively move the third plunger 74, via a second actuator 86 that can be controlled to selectively move the second plunger 72, and via an electronic controller 88 that can activate either or both of the actuators 84, 86 in response to input signals 90 indicative of different vehicle operating conditions as discussed herein. The input signals 90 can be sensor signals received from sensors on the vehicle 14, such as an accelerometer, speed sensors, or other suitable sensors. Optionally, pressure sensors could be positioned to monitor the gas pressure in the chambers 42, 44, and sensed pressure can be provided as an input signal to the controller 88 for use as part of a control algorithm by which actuators 84, 86 are actuated.

The first actuator 84 can be electric, hydraulic, pneumatic, or any other suitable type of actuator. The first actuator 84 can act on the neck 75 to move the third plunger 74. For example, the controller 88 sends an electronic control signal to the actuator 84 when an input signal 90 indicates a first operating condition for which a greater pre-load is desired for the damper 16. Specifically, when the plunger 74 is moved upward in the chamber 42, the volume of gas between the first plunger 70 and the third plunger 74 decreases, which increases the pre-load on the damper 16, providing greater reaction force.

The controller 88 can also control the first actuator 84 to decrease the pre-load on the damper 16 by causing the plunger 74 to move outward, increasing the volume of gas between the first plunger 70 and the third plunger 74. The input signal 90 that causes the controller 88 to activate the actuator 84 can be an operator input signal, such as when a different ride style having an associated pre-load is selected (e.g., sport mode, etc.). Alternatively or in addition, the input signal 90 can be received from sensors or from another controller on the vehicle 14 indicating that the vehicle is subjected to a certain motion, such as turning a corner, as determined by the wheel 28 being turned beyond a predetermined angle A, shown in FIG. 2, or the like. In such an operating condition, where greater reaction support is desired to control pitch, roll or heave, the controller 88 can activate the actuator 84 to move the plunger 74. In one embodiment, the position of plunger 74 can be monitored and used as a means to track thermal expansion of the fluid in the damper 16

Figure 6:
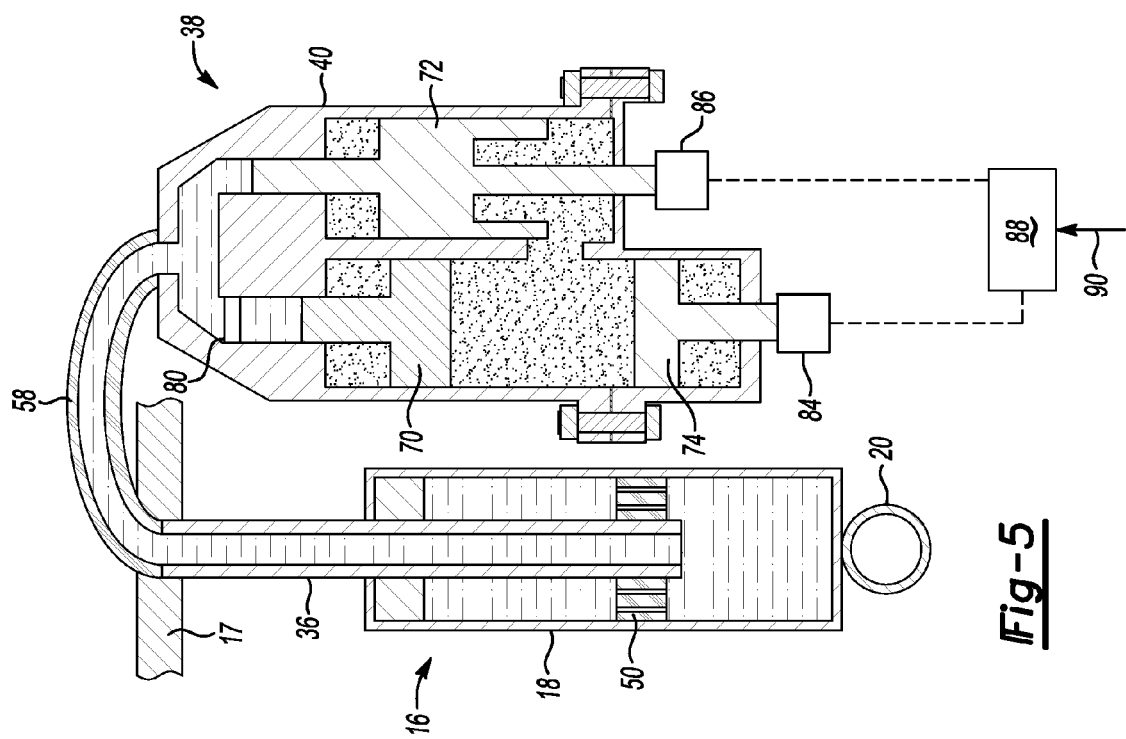
FIG. 6 is a schematic illustration in fragmentary cross-sectional view of the portion of a vehicle suspension system having the damper assembly of FIG. 1 with the damper assembly in the intermediate position and a second actuator actuating another plunger to vary spring rate of the damper assembly and ride height of the vehicle.

Active control can also be accomplished when the controller 88 activates a second actuator 86. The second actuator 86 can be electric, hydraulic, pneumatic, or any other suitable type of actuator and acts on the neck 78 of the second plunger 72 to move the second plunger 72. For example, the controller 88 sends an electronic control signal to the actuator 86 to move the second plunger 92 when a different input signal 90 indicates a second operating condition for which an adjustment in ride height is desired for the vehicle 14. The actuator 86 can act on the neck 78 of the plunger 72, moving the entire plunger 72 toward the branch passage 64. As a greater length of the neck 73 will then be in the branch passage 64, hydraulic fluid in the passageway 54 will be forced back through the flexible tube 58 and the rod 36 into the fluid chamber 45, forcing the damper housing 18 away from the vehicle body 16 and increasing the ride height. If an input signal 90 indicates that a lower ride height is desired, then the reverse process can be implemented by the controller 88 sending a control signal to the actuator 86, to move the plunger 72 away from the branch passage 64, thereby causing the damper housing 18 to move toward the vehicle body 17. FIG. 1 is indicative of a high ride height, and FIG. 6 is indicative of a low ride height, as indicated by the positions of the plunger 72 and the damper housing 18 in each of FIGS. 1 and 6.

Controlled movement of the plunger 72 as described can also be implemented in response to an input signal 90 indicating a desired change in the spring rate of the gas spring 38. Specifically, when the plunger 72 is in the position shown in FIG. 1, gas in the second gas chamber 44 is in fluid communication with gas in the first gas chamber 42 through a window 100 formed by the manifold 40. When the plunger 72 is moved to a predetermined position, shown in FIG. 6, the window 100 is blocked by a flange 102 of the plunger 72 so that gas in the second gas chamber 44 is not in fluid communication with gas in the first gas chamber 42. Movement of the first plunger 70 during compression (e.g., when the damper housing 18 moves from the position of FIG. 1 to the position of FIG. 6) will require the plunger 72 to act against a smaller volume of gas (only the volume between plungers 70 and 72 in the first gas chamber 42 without any additional volume of the secondary chamber 42), thereby increasing the spring rate of the gas spring 38.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle suspension system comprising:
   a housing defining an interior chamber containing an incompressible fluid and a hollow rod supporting a piston with the rod and the piston extending into the interior chamber, the housing being movable relative to the hollow rod such that fluid volume in the interior chamber varies;
   a multi-chambered manifold operatively connected to the hollow rod and having a first gas chamber and a second gas chamber;
   a first plunger, a second plunger, and a third plunger supported by the manifold; wherein the first plunger extends into the first gas chamber and is in fluid communication with the interior chamber via the hollow rod so that the first plunger moves relative to the first gas chamber in response to movement of the housing relative to the hollow rod; wherein the second plunger extends into the second gas chamber and is in fluid communication with the interior chamber via the hollow rod; wherein the third plunger extends into the first gas chamber;
   a first actuator operable to move the third plunger to vary a volume of the first gas chamber between the first and third plungers; and
   a second actuator operable to move the second plunger to vary a volume of the second gas chamber in fluid communication with the first gas chamber and simultaneously vary fluid volume in the interior chamber to thereby move the housing relative to the hollow rod.

2. The vehicle suspension system of claim 1, further comprising:
   a passive valve assembly in the multi-chambered manifold between the hollow rod and the first plunger; and
   wherein the passive valve assembly is configured to create a pressure drop such that dynamic fluid pressure in the hollow rod is greater than dynamic fluid pressure at the first plunger.

3. The vehicle suspension system of claim 1, wherein the second plunger is configured to selectively block fluid communication between the first gas chamber and the second gas chamber when moved by the second actuator to a predetermined position.

4. The vehicle suspension system of claim 1, further comprising:
   a tube operatively connecting the hollow rod to the manifold such that the incompressible fluid flows through the tube between the hollow rod and the manifold.

5. The vehicle suspension system of claim 1, wherein the housing and the manifold are arranged adjacent one another such that movement of the housing is generally parallel with movement of the first and the second plungers.

6. The vehicle suspension system of claim 1, further comprising:
   a controller operatively connected to the first and the second actuators; wherein the controller is configured to cause the first actuator to move the third plunger in response to a first operating condition to thereby adjust a pre-load of the first plunger, and is configured to cause the second actuator to move the second plunger in response to a second operating condition to thereby adjust a spring rate of the first plunger and a static position of the housing relative to the hollow rod.

7. A vehicle comprising:
   a tire and wheel assembly;
   a sprung mass;
   a suspension system including a damper assembly operatively connected to the tire and wheel assembly and configured to manage forces causing displacement of the wheel relative to the sprung mass, the damper assembly having:
   a hydraulic damper having a housing defining a hydraulic chamber and a hollow rod supporting a piston, the rod and the piston extending into the hydraulic chamber, the housing being fixed to the tire and wheel assembly and the hollow rod being fixed to the sprung mass, the housing being movable with the tire and wheel assembly relative to the hollow rod such that hydraulic fluid volume in the hydraulic chamber varies;
   a gas spring that has:
   a multi-chambered manifold operatively connected to the hydraulic damper and having a first pneumatic chamber and a second pneumatic chamber;
   a first plunger, a second plunger, and a third plunger supported by the manifold; wherein the first plunger extends into the first pneumatic chamber and is in fluid communication with the hydraulic chamber via the hollow rod so that the first plunger moves relative to the first pneumatic chamber in response to movement of the housing relative to the hollow rod; wherein the second plunger extends into the second pneumatic chamber and is in fluid communication with the hydraulic chamber via the hollow rod; wherein the third plunger extends into the first pneumatic chamber;

a first actuator operable to move the third plunger to vary the volume of the first pneumatic chamber and thereby vary pre-load of the damper assembly;

a second actuator operable to move the second plunger to vary a volume of the second pneumatic chamber in fluid communication with the first pneumatic chamber and simultaneously vary hydraulic fluid volume in the hydraulic chamber to thereby vary spring rate of the gas spring and ride height of the vehicle; and a controller operatively connected to the first and the second actuators and configured to cause the first actuator to move the third plunger in response to a first operating condition, and configured to cause the second actuator to move the second plunger in response to a second operating condition.

8. The vehicle of claim 7, further comprising a passive valve assembly in the multi-chambered manifold between the hollow rod and the first plunger, and configured to create a pressure drop such that dynamic fluid pressure in the hollow rod is greater than dynamic fluid pressure at the first plunger.

9. The vehicle of claim 7, wherein the second plunger is configured to selectively block fluid communication between the first pneumatic chamber and the second pneumatic chamber when moved by the second actuator to a predetermined position.

10. The vehicle of claim 7, further comprising:
a tube operatively connecting the hollow rod to the manifold such that the hydraulic fluid flows through the tube between the hollow rod and the manifold.

11. The vehicle of claim 7, wherein the housing and the manifold are arranged adjacent to one another.

* * * * *